(12) United States Patent
Kurokawa

(10) Patent No.: US 8,190,397 B2
(45) Date of Patent: May 29, 2012

(54) FAILURE DIAGNOSIS APPARATUS FOR EXHAUST PRESSURE SENSOR

(75) Inventor: Yoshiki Kurokawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 342 days.

(21) Appl. No.: 12/566,257

(22) Filed: Sep. 24, 2009

(65) Prior Publication Data

US 2010/0082298 A1    Apr. 1, 2010

(30) Foreign Application Priority Data

Sep. 30, 2008  (JP) .................................. 2008-251977

(51) Int. Cl.
*G06F 11/30* (2006.01)
(52) U.S. Cl. ............ 702/185; 702/47; 702/98; 702/138; 701/108; 701/114; 701/115; 123/568.16; 123/568.21; 123/568.25; 123/568.26; 123/568.27; 60/602; 60/605.2
(58) Field of Classification Search ............... 702/47, 702/98, 138, 185; 701/108, 114, 115; 123/568.16, 123/568.21, 568.25–56.278; 60/602, 605.2
See application file for complete search history.

(56) References Cited

U.S. PATENT DOCUMENTS

| 6,850,833 B1 | 2/2005 | Wang et al. |
| 2002/0189599 A1 | 12/2002 | Kotwicki et al. |

FOREIGN PATENT DOCUMENTS

| EP | 1 245 812 A2 | 10/2002 |
| JP | 06-167236 A | 6/1994 |
| JP | 6-167236 A | 6/1994 |
| JP | 09-268939 A | 10/1997 |

OTHER PUBLICATIONS

Kazuhiro et al. (JP 06-167236) Translation.*

* cited by examiner

*Primary Examiner* — Sujoy Kundu
(74) *Attorney, Agent, or Firm* — Arent Fox LLP

(57) ABSTRACT

A failure diagnosis apparatus for an exhaust pressure sensor for detecting the exhaust pressure in an exhaust gas recirculation passage which connects an exhaust passage and an intake passage of an internal combustion engine. A first preliminary determination that the exhaust pressure sensor is normal, is made when the engine is in a predetermined low load operating condition and a difference between the detected exhaust pressure and the atmospheric pressure is equal to or less than a first determination threshold value. A second preliminary determination that the exhaust pressure sensor is normal, is made when the engine is in a predetermined high load operating condition and the difference between the exhaust pressure detected by the exhaust pressure sensor and the atmospheric pressure is equal to or greater than a second determination threshold value. A final determination that the exhaust pressure sensor is normal, is made when both of the first and second preliminary determinations are made.

6 Claims, 5 Drawing Sheets

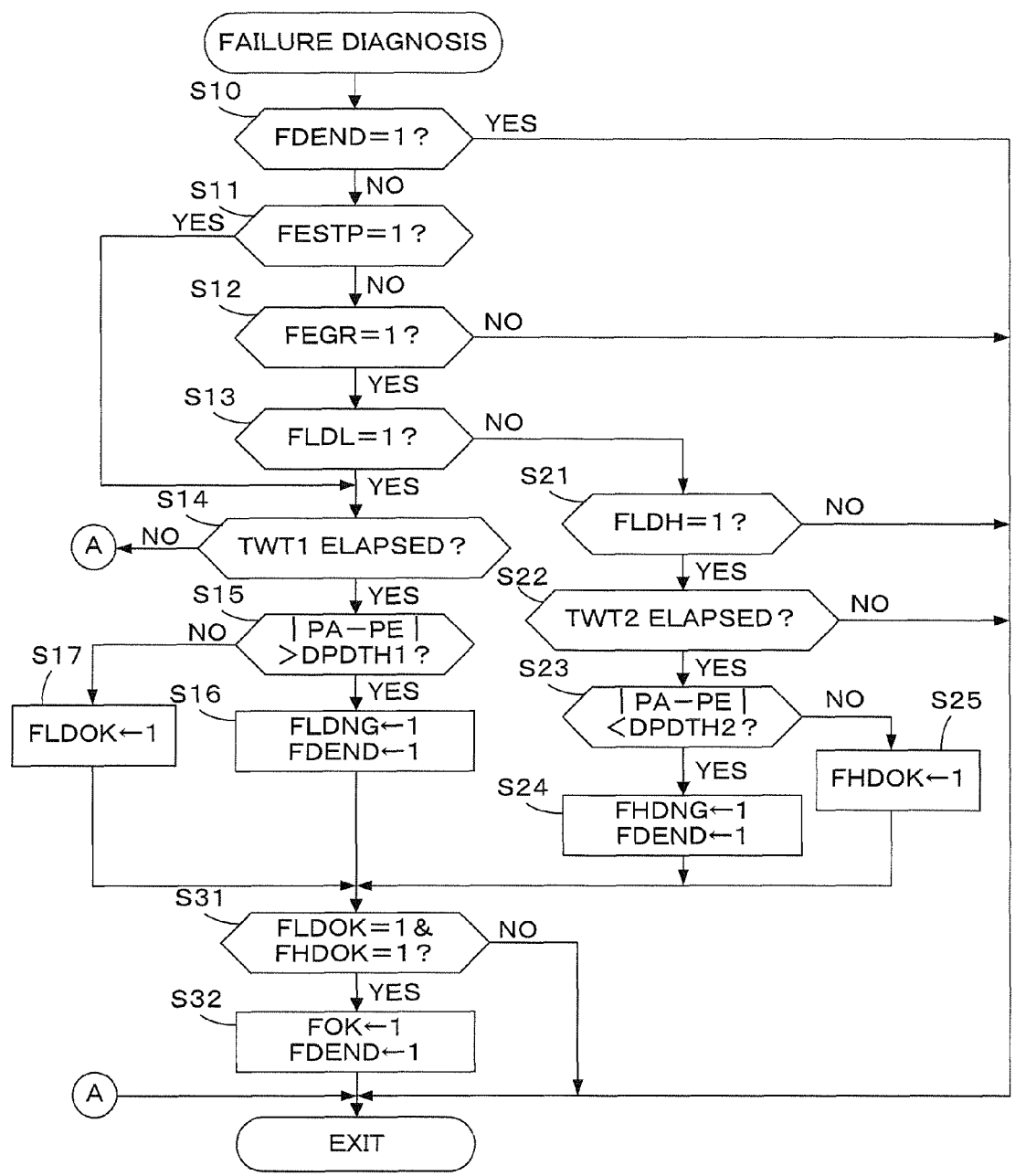

FAILURE DIAGNOSIS APPARATUS FOR EXHAUST PRESSURE SENSOR

CROSS-REFERENCE TO RELATED APPLICATION

This application claims the priority of Japanese Application No. JP2008-251977, filed Sep. 30, 2008, the entire specification, claims and drawings of which are incorporated herewith by reference.

BACKGROUND OF THE INVENTION

1. Field of the Invention

The present invention relates to a failure diagnosis apparatus for an exhaust pressure sensor which detects an exhaust pressure of an internal combustion engine.

2. Description of the Related Art

Japanese Patent Laid-open No. H06-167236 (JP-'236) discloses a failure detecting apparatus for detecting a failure of a pressure sensor which detects a pressure in an exhaust gas recirculation passage of an internal combustion engine. According to this apparatus, it is determined that the pressure sensor has failed if a difference between the pressure in the passage detected by the pressure sensor and the atmospheric pressure is less than the predetermined value in the closed state of an exhaust gas recirculation control valve which opens and closes the exhaust gas recirculation passage.

The above-described conventional apparatus can detect a stuck failure caused by freeze of the pressure sensor when the output of the pressure sensor indicates a value of a pressure in the vicinity of the atmospheric pressure. However, it is impossible to detect a stuck failure caused when the pressure sensor indicates a value of a pressure which is higher than the atmospheric pressure by the predetermined value (i.e., the difference between the detected pressure and the atmospheric pressure is greater than the predetermined value). Therefore, there is a possibility of an erroneous determination that the pressure sensor may be normal, although the pressure sensor has actually failed.

SUMMARY OF THE INVENTION

The present invention was made contemplating the above-described point, and an object of the invention is to provide a failure diagnosis apparatus, which can accurately determine a normal state of the exhaust pressure sensor for detecting a pressure in the exhaust gas recirculation passage.

To attain the above object, the present invention provides a failure diagnosis apparatus for an exhaust pressure sensor (21) for detecting the exhaust pressure in an exhaust gas recirculation passage (6) which connects an exhaust passage (4) and an intake passage (2) of an internal combustion engine. The failure diagnosis apparatus includes atmospheric pressure detecting means (22), first determining means, second determining means, and final determining means. The atmospheric pressure detecting means detects the atmospheric pressure (PA). The first determining means makes a first preliminary determination that said exhaust pressure sensor is normal when said engine is in a predetermined low load operating condition and a difference between the exhaust pressure (PE) detected by said exhaust pressure sensor and the atmospheric pressure (PA) is equal to or less than a first determination threshold value (DPDTH1). The second determining means makes a second preliminary determination that said exhaust pressure sensor is normal when said engine is in a predetermined high load operating condition and the difference between the exhaust pressure (PE) detected by said exhaust pressure sensor and the atmospheric pressure (PA) is equal to or greater than a second determination threshold value (DPDTH2). The final determining means making a final determination that said exhaust pressure sensor is normal, when both of the first and second preliminary determinations are made by said first and second determining means.

With this configuration, when the engine is in the predetermined low load operating condition and the difference between the exhaust pressure detected by the exhaust pressure sensor and the atmospheric pressure is equal to or less than the first determination threshold value, the exhaust pressure sensor is preliminarily determined to be normal. Further, when the engine is in the predetermined high load operating condition and the difference between the exhaust pressure detected by the exhaust pressure sensor and the atmospheric pressure is equal to or greater than the second determination threshold value, the exhaust pressure sensor is preliminarily determined to be normal. The exhaust pressure sensor is finally determined to be normal, when both of the two preliminary determination results are normal. By the preliminary normal determination in the predetermined low load operating condition, it is confirmed that the output of the exhaust pressure sensor is not fixed at a value indicating a comparatively higher pressure with respect to the atmospheric pressure. Further, by the preliminary normal determination in the predetermined high load operating condition, it is confirmed that the output of the exhaust pressure sensor is not fixed at a value indicating a pressure in the vicinity of the atmospheric pressure. Therefore, by making the final determination with the two preliminary determination results, normality of the exhaust pressure sensor is accurately determined.

Preferably, the failure diagnosis apparatus further includes threshold value setting means, wherein the exhaust gas recirculation passage (6) is provided with an exhaust gas recirculation control valve (7) for controlling an exhaust gas recirculation amount and said threshold value setting means sets the first determination threshold value (DPDTH1) and the second determination threshold value (DPDTH2) according to an opening (LCMD) of the exhaust gas recirculation control valve.

With this configuration, the first determination threshold value and the second determination threshold value are set according to the opening of the exhaust gas recirculation control valve. Consequently, the failure diagnosis of the exhaust pressure sensor can be performed accurately even if the exhaust gas recirculation amount changes.

BRIEF DESCRIPTION OF THE DRAWINGS

FIG. 3 is a flowchart of a process for performing a failure diagnosis of the exhaust pressure sensor (first embodiment);

DETAILED DESCRIPTION OF THE PREFERRED EMBODIMENTS

Preferred embodiments of the present invention will now be described with reference to the drawings.

First Embodiment

Figure 1:
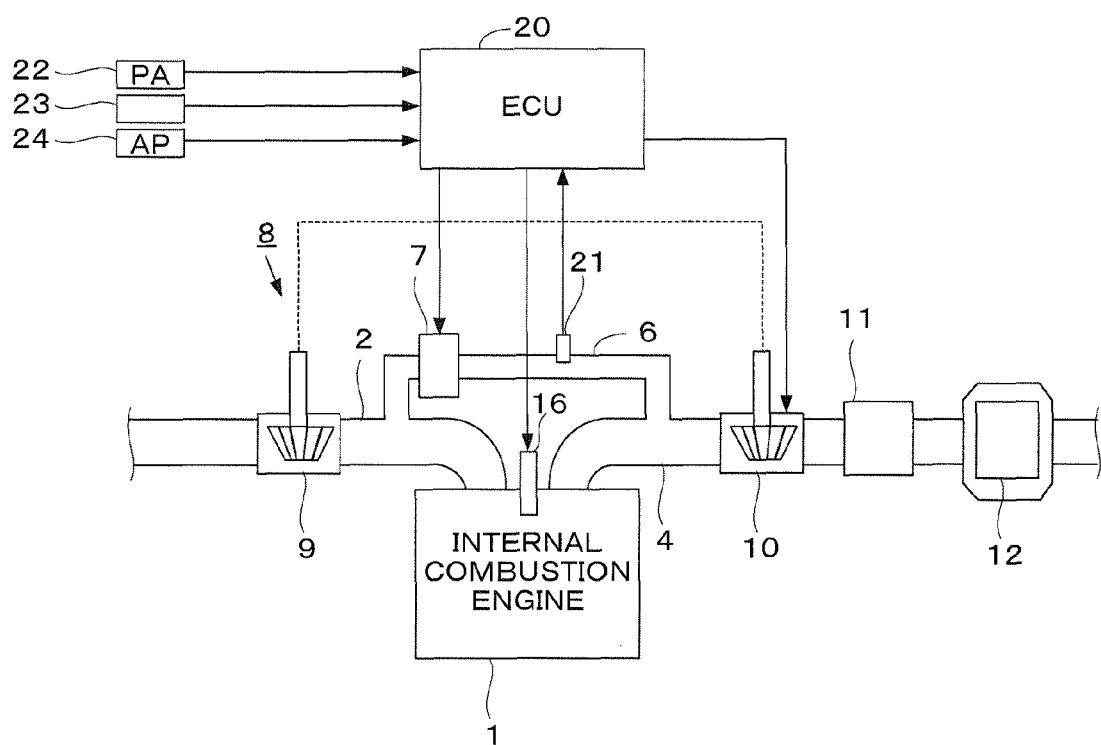
FIG. 1 is a schematic diagram of an internal combustion engine and a control system therefor according to an embodiment of the present invention.

FIG. 1 is a schematic diagram showing the configuration of an internal combustion engine and a control system therefor according to an embodiment of the present invention. An internal combustion engine 1 (hereinafter referred to merely as "engine") is a diesel engine in which fuel is injected directly into the cylinders, wherein each cylinder is provided with a fuel injection valve 16. The fuel injection valve 16 is electrically connected to an electronic control unit 20 (hereinafter referred to as "ECU"). The valve opening time period and valve opening timing of the fuel injection valve 16 are controlled by the ECU 20.

The engine 1 has an intake passage 2, an exhaust passage 4, an exhaust gas recirculation passage 6, and a turbocharger 8. The turbocharger 8 includes a turbine 10 and a compressor 9. The turbine 10 is driven by the kinetic energy of exhaust gases. The compressor 9, which is rotationally driven by the turbine 10, compresses the intake air. The turbine 10 has a plurality of movable vanes (not shown), and is configured so that the rotational speed of the turbine 10 is adjusted by changing an opening of the movable vanes. The opening of the vanes in the turbine 10 is electro-magnetically controlled by the ECU 20.

The exhaust gas recirculation passage 6 is provided between the downstream side of the compressor 9 of the intake passage 2 and the upstream side of the turbine 10 in the exhaust passage 4. The exhaust gas recirculation passage 6 is provided with an exhaust gas recirculation control valve 7 (hereinafter referred to as "EGR valve") for controlling an amount of the recirculated exhaust gases. The valve opening of the EGR valve 7 is controlled by the ECU 20. Specifically, a valve opening command value LCMD is calculated according to an engine operating condition, and a drive signal for the EGR valve 7 is generated so that the actual valve opening LACT coincides with the valve opening command value LCMD.

The exhaust passage 4 is provided with a catalytic converter 11 for purifying the exhaust gases and a diesel particulate filter 12 (hereinafter referred to as "DPF"). The catalytic converter 11 contains an oxidation catalyst for promoting oxidization of hydrocarbon and carbon monoxide in the exhaust gases. The DPF 12 traps soot which consists of particulates whose main component is carbon (C) in the exhaust gases, when the exhaust gases pass through small holes in the filter wall. Specifically, the inflowing soot is accumulated on the surface of the filter wall and in the small holes in the filter wall.

An exhaust pressure sensor 21 for detecting a pressure PE of the exhaust gases is provided upstream of the EGR valve 7 (exhaust passage side) in the exhaust gas recirculation passage 6. Further, an atmospheric pressure sensor 22, a crank angle position sensor 23, and an accelerator sensor 24 are provided. The atmospheric pressure sensor 22 detects the atmospheric pressure PA. The crank angle position sensor 23 detects the rotational angle of the crankshaft of the engine 1. The accelerator sensor 24 detects the operation amount AP of an accelerator pedal of the vehicle driven by the engine 1 (this operation amount will be hereinafter referred to as "accelerator operation amount"). The detection signals of these sensors are supplied to the ECU 20. A rotational speed NE of the engine 1 is calculated from the output of the crank angle position sensor 23. A demand torque TRQ of the engine 1 is calculated according to the accelerator operation amount AP, and is set so as to increase as the accelerator operation amount AP increases.

The ECU 20 includes an input circuit having various functions including a function of shaping the waveforms of the input signals from the various sensors, a function of correcting the voltage level to the input signals to a predetermined level, and a function of converting analog signal values into digital signal values. The ECU 20 further includes a central processing unit (hereinafter referred to as "CPU"), a memory circuit, and an output circuit. The memory circuit preliminarily stores various operation programs to be executed by the CPU and the results of computation or the like by the CPU. The output circuit supplies control signals to the fuel injection valve 16 and the EGR valve 7.

Figure 2A:
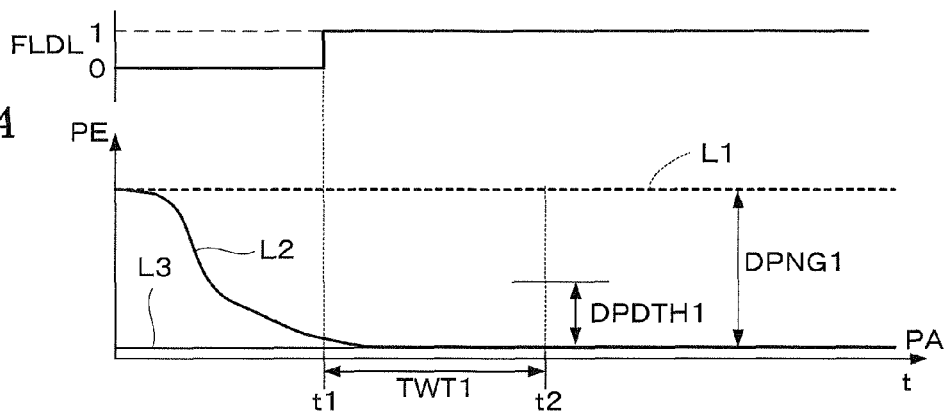
FIGS. 2A and 2B are time charts for illustrating a failure diagnosis method of an exhaust pressure sensor.
Figure 2B:
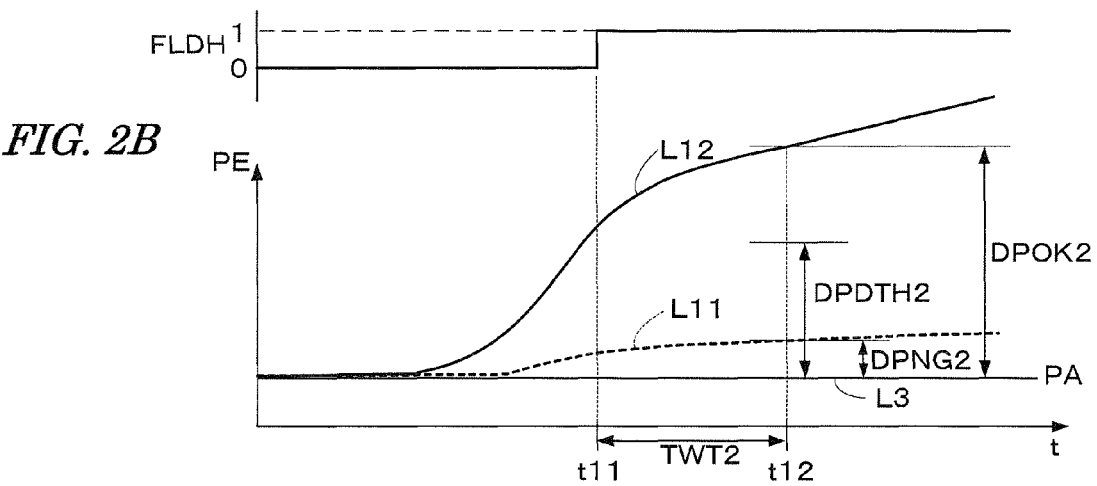

In this embodiment, the ECU 20 performs a failure diagnosis of the exhaust pressure sensor 21 with the method described below. FIGS. 2A and 2B are time charts for illustrating the failure diagnosis method. Specifically, when the engine 1 is in a predetermined low load operating condition, a low load determination is performed, and when the engine 1 is in a predetermined high load operating condition, a high load determination is performed. Subsequently, the exhaust pressure sensor 21 is finally determined to be normal if both of the two determination results are normal.

FIG. 2A is a time chart for illustrating the low load determination. When a low load determination execution condition is satisfied at time t1, a low load determination execution flag FLDL is set to "1". At time t2, when a first predetermined time period TWT1 (e.g., 1 to 2 seconds) has elapsed from time 1, it is determined whether or not a pressure difference DP (=|PA−PE|) between the exhaust pressure PE detected by the exhaust pressure sensor 21 and the atmospheric the pressure PA is greater than a first determination threshold value DPDTH1. If DP is greater than DPDTH1, i.e., the exhaust pressure power PE changes as shown by the dashed line L1 and the pressure difference DP at time t2 is equal to DPNG1 shown in FIG. 2A, it is determined that a first failure of the exhaust pressure sensor 21 has occurred. Specifically, the first failure is a failure that the sensor output is fixed at a value indicating a pressure which is higher than the atmospheric pressure by an amount greater than the first determination threshold value DPDTH1. On the other hand, if the pressure difference DP is equal to or less than the first determination threshold value DPDTH1, i.e., the exhaust pressure PE changes as shown by the thick solid line L2 and the pressure difference DP at time t2 is substantially equal to "0", a first preliminary normal determination is made (the exhaust pressure sensor 12 is preliminarily determined to be normal). It is to be noted that the atmospheric pressure PA is shown by the thin solid line L3.

FIG. 2B is a time chart for illustrating the high load determination. When a high load determination execution condition is satisfied at time t11, a high load determination execution flag FLDH is set to "1". At time t12, when a second predetermined time TWT2 (e.g., 1 to 2 seconds) has elapsed from time t11, it is determined whether or not the pressure difference DP between the exhaust pressure PE detected by the exhaust pressure sensor 21 and the atmospheric pressure PA is less than a second determination threshold value DPDTH2. If DP is less than DPDTH2, i.e., the exhaust pressure PE changes as shown by the dashed line L11 and the pressure difference DP at time t12 is equal to DPNG2 shown in FIG. 2B, it is determined that a second failure of the exhaust pressure sensor 21 has occurred. Specifically, the second failure is a failure that the sensor output is fixed at a value indicating a pressure which is in the vicinity of the atmospheric pressure. On the other hand, when the pressure differences DP is equal to or greater than the second determination threshold value DPDTH2, i.e., the exhaust pressure PE changes as shown by the thick solid line L12 and the pressure difference DP at time t12 is equal to DPOK2 shown in FIG. 2B, a second preliminary normal determination is made (the exhaust pressure sensor 21 is preliminarily determined to be normal).

If both of the first and second preliminary normal determinations are made, a final determination that the exhaust pressure sensor 21 is normal is made.

In this embodiment, the first determination threshold value DPDTH1 and the second determination threshold value DPDTH2 are set to values previously obtained by experiments. Upon setting the threshold values DPDTH1 and DPDTH2, differences in the characteristic of the exhaust pressure sensor 21, influence of noises which change depending on the engine operating condition, and the like are taken into consideration.

FIG. 3 is a flowchart of a process which performs the failure diagnosis described above. This process is executed at predetermined time intervals by the CPU in the ECU 20.

In step S10, it is determined whether or not a diagnosis end flag FDEND is equal to "1". The diagnosis end flag FDEND is set to "1" in steps S16, S24, or S32 as described below. The answer to step S10 is initially negative (NO), and the process proceeds to step S11.

In step S11, it is determined whether or not an engine stop flag FESTP is equal to "1". The engine stop flag FESTP is set to "1" when the engine 1 stops, e.g., by turning off the ignition switch or by automatic idle-stop function. If the engine stop flag FESTP is equal to "1", the process immediately proceeds to step S14. If FESTP is equal to "0", i.e., the engine 1 is operating, the process proceeds to step S12.

In step S12, it is determined whether or not an exhaust gas recirculation flag FEGR is equal to "1". The exhaust gas recirculation flag FEGR is set to "1" when the exhaust gas recirculation is performed by opening the EGR valve 7. If the answer to step S12 is negative (NO), the process immediately ends. If the answer to step S12 is affirmative (YES), it is further determined whether or not a low load determination execution flag FLDL is equal to "1" (step S13). The low load determination execution flag FLDL is set to "1", for example, when the engine 1 is in the idling condition.

If the answer to step S13 is negative (NO), it is determined whether or not a high load determination execution flag FLDH is equal to "1" (step S21). The high load determination execution flag FLDH is set to "1" when the engine demand torque TRQ is greater than a predetermined torque TRQTH and the engine rotational speed NE is greater than a predetermined rotational speed NETH. It is to be noted that a fuel injection amount QINJ calculated according to the demand torque TRQ may be used as a parameter which indicates the engine load. If the answer to step S21 is negative (NO), none of the low load determination and the high load determination can be performed. Accordingly, the process immediately ends.

If the answer to step S13 is affirmative (YES), i.e., the execution condition of the low load determination is satisfied, the process proceeds to step S14, in which it is determined whether or not a first predetermined time period TWT1 has elapsed from the time the low load determination execution condition was satisfied or the time the engine stopped (step S11). While the answer to step S14 is negative (NO), the process immediately ends. If the answer to step S14 becomes affirmative (YES), the process proceeds to step S15, in which it is determined whether or not the pressure difference DP (=|PA−PE|) between the atmospheric pressure PA and the exhaust pressure PE is greater than the first determination threshold value DPDTH1. If the answer to step S15 is negative (NO), a first preliminary normal determination flag FLDOK is set to "1" (step S17), and the process proceeds to step S31.

If the answer to step S15 is affirmative (YES), it is determined that the first failure that the sensor output fixed to a value indicating a pressure which is comparatively higher than the atmospheric pressure, has occurred. Accordingly, the first failure flag FLDNG is set to "1" and the diagnostic end flag FDEND is set to "1" (step S16). If the diagnostic end flag FDEND is set to "1", the answer to step S11 thereafter becomes affirmative (YES), and the failure diagnosis process ends.

On the other hand, if the answer to step S21 is affirmative (YES), i.e., the execution condition of the high load determination is satisfied, it is determined whether or not a second predetermined time period TWT2 has elapsed from the time the high load determination execution condition was satisfied (step S22). If the answer to step S22 is negative (NO), the process immediately ends. If the answer to step S22 becomes affirmative (YES), the process proceeds to step S23, in which it is determined whether or not the pressure difference DP (=|PA−PE|) is less than the second determination threshold value DPDTH2. If the answer to step S23 is negative (NO), a second preliminary normal determination flag FHDOK is set to "1" (step S25), and the process proceeds to step S31.

If the answer to step S23 is affirmative (YES), it is determined that the second failure that the sensor output is fixed at a value indicating a pressure in the vicinity of the atmospheric pressure, has occurred. Accordingly, the second failure flag FHDNG is set to "1" and the diagnostic end flag FDEND is set to "1" (step S24).

In step S31, it is determined whether or not both of the first preliminary normal determination flag FLDOK and the second preliminary normal determination flag FHDOK are equal to "1". If the answer to step S31 is negative (NO), the process immediately ends. If the answer to step S31 is affirmative (YES), the final determination that the exhaust pressure sensor 21 is normal is made. Accordingly, a normal flag FOK is set to "1" and the diagnostic end flag FDEND is set to "1" (step S32).

In this embodiment described above, when the engine 1 is in the predetermined low load operating condition (including a condition of stoppage of the engine 1) and the low load determination execution condition is satisfied, the exhaust pressure sensor 21 is preliminarily determined to be normal, if the pressure difference DP between the exhaust pressure PE detected by the exhaust pressure sensor 21 and the atmospheric pressure PA is equal to or less than the first determination threshold value DPDTH. Then, the first preliminary normal determination flag FLDOK is set to "1". Further, when the engine 1 is in the predetermined high load operating condition and the high load determination execution condition is satisfied, the exhaust pressure sensor 21 is preliminarily determined to be normal, if the pressure differences DP is equal to or greater than the determination threshold values DPDTH2. Then, the second preliminary normal determination flag FHDOK is set to "1". Further, if both of the first preliminary normal determination flag FLDOK and the second preliminary normal determination flag FHDOK are equal to "1", the exhaust pressure sensor 21 is finally determined to be normal.

By the preliminary normal determination in the predetermined low load operating condition, it is confirmed that the output of the exhaust pressure sensor 21 is not fixed at a value indicating a pressure comparatively higher than the atmospheric pressure, i.e., the first failure has not occurred. Further, by the preliminary normal determination in the predetermined high load operating condition, it is confirmed that the output of the exhaust pressure sensor 21 is not fixed at a value indicating a pressure in the vicinity of the atmospheric pressure, i.e., the second failure has not occurred. Therefore, by finally making the normal determination if both of two determination results are normal, normality of the exhaust pressure sensor 21 can be determined accurately.

In this embodiment, the atmospheric pressure sensor 22 corresponds to the atmospheric pressure detecting means, and the ECU 20 functions as the first determining means, the second determining means, and the final determining means. Specifically, steps S13 to S17 of FIG. 3 correspond to the first determining means, steps S21 to S25 correspond to the second determining means, and steps S31 and S32 correspond to the final determining means.

Second Embodiment

In this embodiment, the first determination threshold value DPDTH1 and the second determination threshold value DPDTH2 in the first embodiment are set according to a valve opening command value LCMD of the EGR valve and the atmospheric pressure PA. The present embodiment is the same as the first embodiment except for the points described below.

Figure 4:
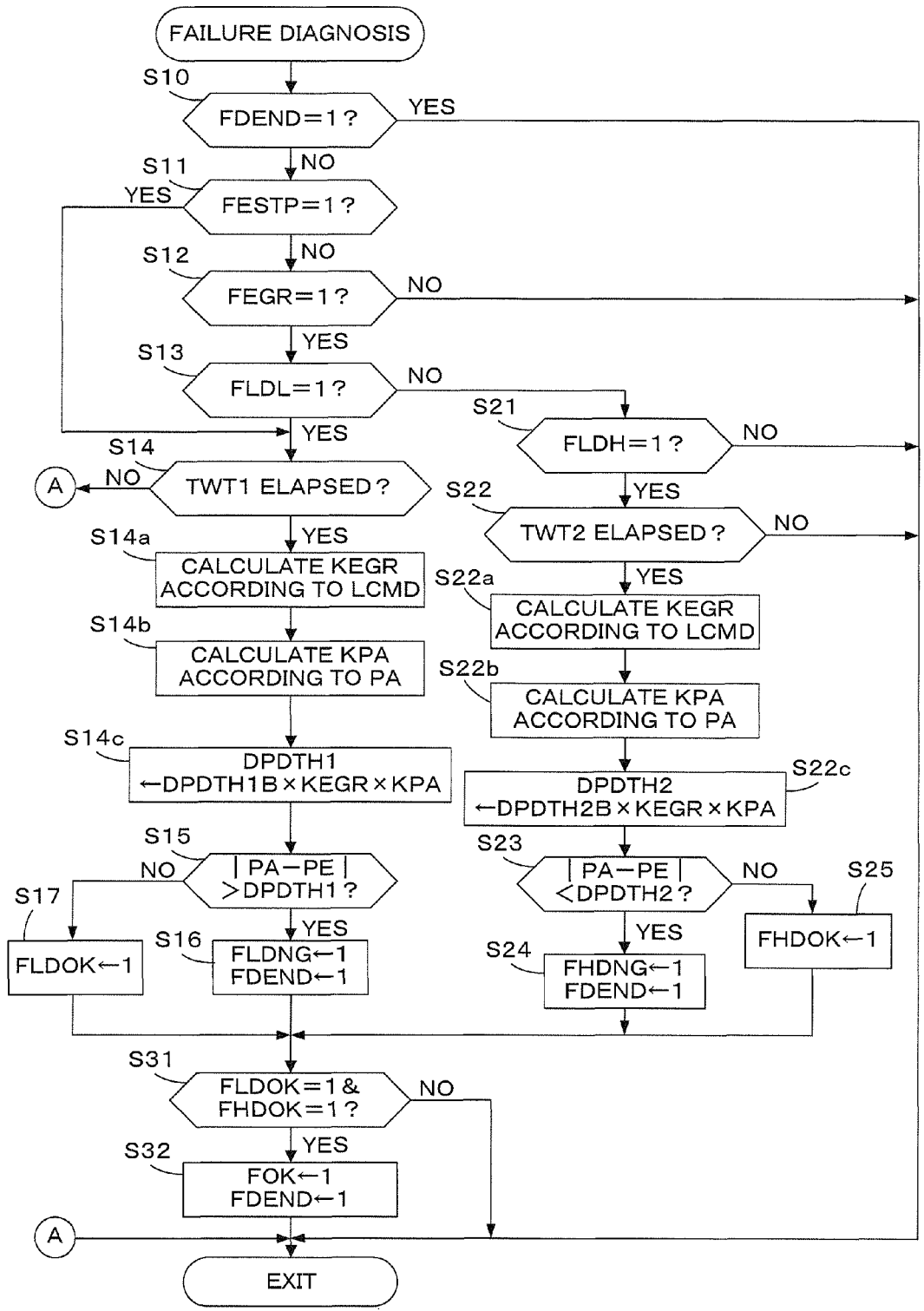
FIG. 4 is a flowchart of a process for performing a failure diagnosis of the exhaust pressure sensor (second embodiment)

FIG. 4 is a flowchart of the failure diagnosis process in this embodiment, and this process obtained by adding steps S14$a$, S14$b$, S14$c$, S22$a$, S22$b$, and S22$c$ to the process shown in FIG. 3.

Figure 5A:
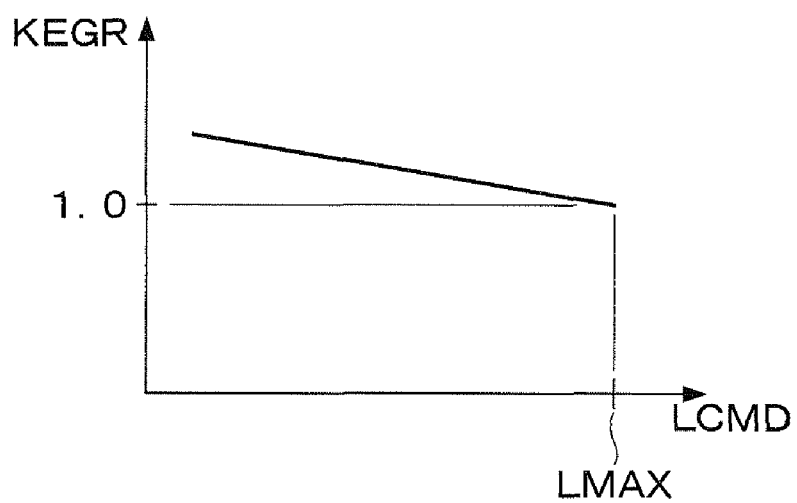
FIGS. 5A and 5B show tables referred to in the process of FIG. 4.

In step S14$a$, a KEGR table shown in FIG. 5A is retrieved according to the valve opening command value LCMD, to calculate an EGR correction coefficient KEGR. The KEGR table is set so that the EGR correction coefficient KEGR increases as the valve opening command value LCMD decreases. The KEGR table is set contemplating that the detected value of the exhaust pressure sensor 21 tends to increase as the valve opening command value LCMD decreases. "LMAX" in FIG. 5A is a valve opening corresponding to the fully-opened state of the EGR valve 7.

Figure 5B:
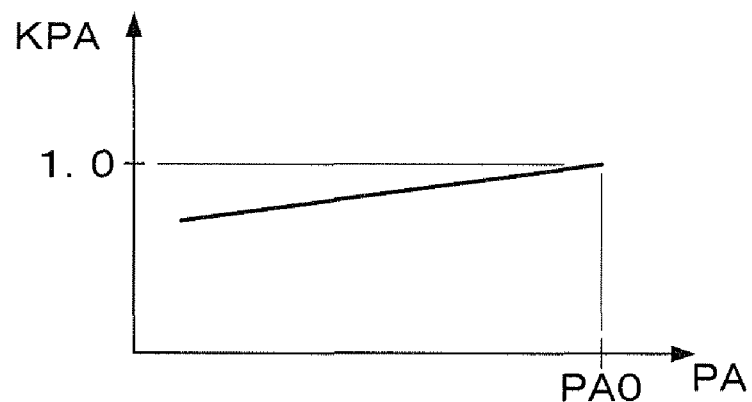

In step S14$b$, a KPA table shown in FIG. 5B is retrieved according to the atmospheric pressure PA, to calculate an atmospheric pressure correction coefficient KPA. The KPA table is set so that the atmospheric pressure correction coefficient KPA decreases as the atmospheric pressure PA decreases. The KPA table is set contemplating that the pressure difference DP tends to decrease as the atmospheric pressure PA decreases.

In step S14$c$, the EGR correction coefficient KEGR and the atmospheric pressure correction coefficient KPA are applied to the following equation (1), to calculate the first determination threshold value DPDTH1. In the equation (1), DPDTH1B is a first reference threshold value corresponding to the state where the atmospheric pressure PA is equal to 101.3 kPa (reference atmospheric pressure) and the EGR valve 7 being fully-opened.

$$DPDTH1 = DTDTH1B \times KEGR \times KPA \quad (1)$$

In steps S22$a$ and S22$b$, the EGR correction coefficient KEGR and the atmospheric pressure correction coefficient KPA are calculated similarly to steps S14$a$ and S14$b$. In step S22$c$, the EGR correction coefficient KEGR and the atmospheric pressure correction coefficient KPA are applied to the following equation (2), to calculate the second determination threshold value DPDTH2. In the equation (2), DPDTH2B is a second reference threshold value corresponding to the state where the atmospheric pressure PA is equal to 101.3 kPa and the EGR valve 7 is fully-opened.

$$DPDTH2 = DTDTH2B \times KEGR \times KPA \quad (2)$$

According to the process of FIG. 4, the first determination threshold value DPDTH1 and the second determination threshold value DPDTH2 are set according to the valve opening command value LCMD of the EGR valve 7 and the atmospheric pressure PA. Consequently, even if the valve opening command value LCMD (exhaust gas recirculation amount) and/or the atmospheric pressure PA change(s), the diagnosis can be performed accurately.

In this embodiment, steps S14$a$ to S14$c$ and S22$a$ to S22$c$ of FIG. 4 correspond to the threshold value setting means.

The present invention is not limited to the embodiments described above, and various modifications may be made. For example, in the above-described embodiments, the failure diagnosis apparatus for the exhaust pressure sensor provided in the exhaust gas recirculation passage of the diesel internal combustion engine. The present invention is applicable also to the failure diagnosis apparatus for the exhaust pressure sensor provided in the exhaust gas recirculation passage of a gasoline internal combustion engine.

Further, in the embodiments described above, the present invention is applied to the failure diagnosis of the exhaust pressure sensor provided in the internal combustion engine having the turbocharger. The present invention is applicable also to the failure diagnosis of the exhaust pressure sensor provided in the internal combustion engine having no turbocharger. Furthermore, the present invention can be applied also to the failure diagnosis of the exhaust pressure sensor provided in the exhaust gas recirculation passage of a watercraft propulsion engine, such as an outboard engine having a vertically extending crankshaft.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A failure diagnosis apparatus for an exhaust pressure sensor for detecting the exhaust pressure in an exhaust gas recirculation passage which connects an exhaust passage and an intake passage of an internal combustion engine, said failure diagnosis apparatus comprising:

an atmospheric pressure sensor provided separately from said exhaust pressure sensor, said atmospheric pressure sensor detects the atmospheric pressure;

first determining means for making a first preliminary determination that said exhaust pressure sensor is operating in a normal state and is capable of detecting the exhaust pressure in the exhaust gas recirculation passage when said engine is in a predetermined low load operating condition and the difference between the exhaust pressure detected by said exhaust pressure sensor and the atmospheric pressure is equal to or less than a first determination threshold value;

second determining means for making a second preliminary determination that said exhaust pressure sensor is operating in the normal state and is capable of detecting the exhaust pressure in the exhaust gas recirculation passage when said engine is in a predetermined high load operating condition and the difference between the exhaust pressure detected by said exhaust pressure sensor and the atmospheric pressure is equal to or greater than a second determination threshold value; and final determining means for making a final determination that said exhaust pressure sensor is operating in the normal state and is capable of detecting the exhaust pressure in the exhaust gas recirculation passage, when both of the first and second preliminary determinations are made by said first and second determining means.

2. The failure diagnosis apparatus according to claim 1, further comprising threshold value setting means, wherein the exhaust gas recirculation passage is provided with an exhaust gas recirculation control valve for controlling the exhaust gas recirculation amount and said threshold value setting means sets the first determination threshold value and the second determination threshold value according to the opening of the exhaust gas recirculation control valve.

3. A failure diagnosis method for an exhaust pressure sensor for detecting the exhaust pressure in an exhaust gas recirculation passage which connects an exhaust passage and an intake passage of an internal combustion engine, said failure diagnosis method comprising the steps of:
 a) detecting the atmospheric pressure by a processor with an atmospheric pressure sensor provided separately from said exhaust pressure sensor;
 b) making a first preliminary determination that said exhaust pressure sensor is operating in a normal state and is capable of detecting the exhaust pressure in the exhaust gas recirculation passage when said engine is in a predetermined low load operating condition and the difference between the exhaust pressure detected by said exhaust pressure sensor and the atmospheric pressure is equal to or less than a first determination threshold value;
 c) making a second preliminary determination that said exhaust pressure sensor is operating in the normal state and is capable of detecting the exhaust pressure in the exhaust gas recirculation passage when said engine is in a predetermined high load operating condition and the difference between the exhaust pressure detected by said exhaust pressure sensor and the atmospheric pressure is equal to or greater than a second determination threshold value; and
 d) making a final determination that said exhaust pressure sensor is operating in the normal state and is capable of detecting the exhaust pressure in the exhaust gas recirculation passage, when both of the first and second preliminary determinations are made in said steps b) and c).

4. The failure diagnosis method according to claim 3, further comprising the step of setting the first and second determination threshold values, wherein the exhaust gas recirculation passage is provided with an exhaust gas recirculation control valve for controlling an exhaust gas recirculation amount and the first and second determination threshold values are set according to an opening of the exhaust gas recirculation control valve.

5. A computer program embodied on a non-transitory computer-readable medium for causing a computer to implement a failure diagnosis method for an exhaust pressure sensor for detecting an exhaust pressure in an exhaust gas recirculation passage which connects an exhaust passage and an intake passage of an internal combustion engine, said failure diagnosis method comprising the steps of:
 a) detecting the atmospheric pressure by a processor with an atmospheric pressure sensor provided separately from said exhaust pressure sensor;
 b) making a first preliminary determination that said exhaust pressure sensor is operating in a normal state and is capable of detecting the exhaust pressure in the exhaust gas recirculation passage when said engine is in a predetermined low load operating condition and the difference between the exhaust pressure detected by said exhaust pressure sensor and the atmospheric pressure is equal to or less than a first determination threshold value;
 c) making a second preliminary determination that said exhaust pressure sensor is operating in the normal state and is capable of detecting the exhaust pressure in the exhaust gas recirculation passage when said engine is in a predetermined high load operating condition and the difference between the exhaust pressure detected by said exhaust pressure sensor and the atmospheric pressure is equal to or greater than a second determination threshold value; and
 d) making a final determination that said exhaust pressure sensor is operating in the normal state and is capable of detecting the exhaust pressure in the exhaust gas recirculation passage, when both of the first and second preliminary determinations are made in said steps b) and c).

6. The computer program according to claim 5, wherein the exhaust gas recirculation passage is provided with an exhaust gas recirculation control valve for controlling the exhaust gas recirculation amount, and the failure diagnosis method further comprises the step of setting the first and second determination threshold values according to an opening of the exhaust gas recirculation control valve.

* * * * *